(12) United States Patent
Buzzell et al.

(10) Patent No.: US 6,187,247 B1
(45) Date of Patent: Feb. 13, 2001

(54) INJECTION MOLDING PARTS WITH FASTENER ELEMENTS

(75) Inventors: Keith G. Buzzell, North Waterboro, ME (US); Clinton Dowd, Goffstown, NH (US)

(73) Assignee: Velcro Industries B.V., Curacao (AN)

( * ) Notice: Under 35 U.S.C. 154(b), the term of this patent shall be extended for 0 days.

(21) Appl. No.: 09/076,952

(22) Filed: May 13, 1998

(51) Int. Cl.⁷ .............................. B28B 7/10; B28B 13/06; B29C 45/40; B29C 45/02
(52) U.S. Cl. ........................ 264/334; 264/328.1; 425/139; 425/438; 425/444; 425/545; 425/556
(58) Field of Search ..................... 425/556, 545, 425/139, 444, 438, 589, 590; 264/334, 328.1

(56) References Cited

U.S. PATENT DOCUMENTS

| 700,606 | 5/1902 | Barnes . |
|---|---|---|
| 2,529,091 | 11/1950 | Lester . |

(List continued on next page.)

FOREIGN PATENT DOCUMENTS

| 3301210 A1 | 7/1984 | (DE) . |
|---|---|---|
| 0 598 169 A1 | 5/1994 | (EP) . |
| 50-16385 | 6/1975 | (JP) . |
| 54-101854 | 8/1979 | (JP) . |
| 55-114541 | 9/1980 | (JP) . |
| 58-160129 | 9/1983 | (JP) . |
| 5-77286 | 3/1993 | (JP) . |

Primary Examiner—Tim Heitbrink
Assistant Examiner—Emmanuel S. Luk
(74) Attorney, Agent, or Firm—Fish & Richardson P.C.

(57) ABSTRACT

An injection mold and a method for ejecting, from the mold, a molded product having an array of integrally molded fastener elements extending from a base are provided. In some embodiments, the mold includes a series of ejector pins which progressively eject the product. In other embodiments, the mold includes moveable parts which pull fastener elements out of mold cavities without the use of ejector pins.

19 Claims, 10 Drawing Sheets

U.S. PATENT DOCUMENTS

| | | |
|---|---|---|
| 2,969,569 | 1/1961 | Brown . |
| 3,049,758 | 8/1962 | Drevalas . |
| 3,147,528 | 9/1964 | Erb . |
| 3,197,825 | 8/1965 | Hammond . |
| 3,312,583 | 4/1967 | Rochlis . |
| 3,448,488 | 6/1969 | Kiraly . |
| 3,534,965 | 10/1970 | Harrison et al. . |
| 3,669,598 | 6/1972 | Tucker . |
| 3,708,382 | 1/1973 | Erb . |
| 3,708,833 | 1/1973 | Ribich et al. . |
| 3,762,000 | 10/1973 | Menzin . |
| 3,865,529 | 2/1975 | Guzzo . |
| 3,893,644 | 7/1975 | Drazick . |
| 3,898,315 * | 8/1975 | Haag ........................ 264/312 |
| 3,927,881 | 12/1975 | Lemelson et al. . |
| 3,950,119 * | 4/1976 | Reichenbach ............... 425/251 |
| 3,955,565 | 5/1976 | Johnson, Jr. . |
| 4,006,879 | 2/1977 | Morroni . |
| 4,050,666 | 9/1977 | Van Tichelt . |
| 4,067,951 | 1/1978 | Fleming et al. . |
| 4,123,495 * | 10/1978 | Abey ........................... 264/318 |
| 4,155,698 | 5/1979 | Aichinger . |
| 4,165,875 | 8/1979 | Dykehouse . |
| 4,169,303 | 10/1979 | Lemelson . |
| 4,231,987 * | 11/1980 | Osawa et al. .............. 264/328.1 |
| 4,255,111 * | 3/1981 | Suzuki ........................ 425/383 |
| 4,280,489 | 7/1981 | Johnson, Jr. . |
| 4,306,851 * | 12/1981 | Thune ......................... 425/468 |
| 4,320,748 | 3/1982 | Racette et al. . |
| 4,330,256 * | 5/1982 | Reichenbach et al. ....... 425/537 |
| 4,470,857 | 9/1984 | Casalou . |
| 4,524,943 | 6/1985 | Busch et al. . |
| 4,561,456 | 12/1985 | Gueret . |
| 4,563,380 | 1/1986 | Black et al. . |
| 4,673,542 | 6/1987 | Wigner et al. . |
| 4,678,158 | 7/1987 | Brock . |
| 4,693,921 | 9/1987 | Billarant et al. . |
| 4,710,414 | 12/1987 | Northrup et al. . |
| 4,725,221 | 2/1988 | Blanz . |
| 4,726,975 | 2/1988 | Hatch . |
| 4,775,310 | 10/1988 | Fischer . |
| 4,794,028 | 12/1988 | Fischer . |
| 4,802,939 | 2/1989 | Billarant et al. . |
| 4,814,036 | 3/1989 | Hatch . |
| 4,822,443 | 4/1989 | Dubowik . |
| 4,824,261 | 4/1989 | Provost . |
| 4,840,339 | 6/1989 | Grogan . |
| 4,840,557 | 6/1989 | Ishimoto et al. . |
| 4,842,916 | 6/1989 | Ogawa et al. . |
| 4,870,725 | 10/1989 | Dubowik . |
| 4,872,243 | 10/1989 | Fischer . |
| 4,881,997 | 11/1989 | Hatch . |
| 4,897,032 | 1/1990 | Corteggiani . |
| 4,931,344 | 6/1990 | Ogawa et al. . |
| 4,933,035 | 6/1990 | Billarant et al. . |
| 4,937,124 | 6/1990 | Pafilis . |
| 4,981,132 | 1/1991 | Chong . |
| 4,984,339 | 1/1991 | Provost et al. . |
| 4,998,874 | 3/1991 | Stocchiero . |
| 4,999,067 | 3/1991 | Erb et al. . |
| 5,007,416 | 4/1991 | Burns et al. . |
| 5,031,607 | 7/1991 | Peters . |
| 5,147,657 * | 9/1992 | Giza ........................... 425/117 |
| 5,201,100 | 4/1993 | Cardinale . |
| 5,242,646 | 9/1993 | Torigoe et al. . |
| 5,340,528 | 8/1994 | Machida et al. . |
| 5,368,549 | 11/1994 | McVicker . |
| 5,372,496 | 12/1994 | Taniyama . |
| 5,403,179 | 4/1995 | Ramsey . |
| 5,429,492 | 7/1995 | Tamiyama . |
| 5,449,285 * | 9/1995 | Choiniere et al. ........... 425/546 |
| 5,460,508 | 10/1995 | Ohno et al. . |
| 5,472,335 | 12/1995 | Morikita . |
| 5,492,658 | 2/1996 | Ohno et al. . |
| 5,512,223 | 4/1996 | Morikita . |
| 5,656,226 | 8/1997 | McVicker . |
| 5,980,230 * | 11/1999 | Dowd et al. ................ 425/324.1 |

* cited by examiner

INJECTION MOLDING PARTS WITH FASTENER ELEMENTS

BACKGROUND OF THE INVENTION

This invention relates to the ejection from injection molds of products having arrays of molded fastener elements.

The process for producing an injection molded product typically includes filling a mold cavity with molten polymer, cooling to solidify the molten polymer, opening the mold cavity, and ejecting the molded product. Products having an array of many, small integrally molded fastener elements, such as hook elements for hook and loop fastening, can be difficult to eject, for example, due to their small dimensions, low strengths or their tendency to be retained by features of the mold cavity. This is particularly the case when it is sought to design the hooks with complex or minute features to obtain improved hook performance.

SUMMARY OF THE INVENTION

An injection mold is provided that includes an ejection system capable of ejecting a molded product that includes an array of integrally formed fastener elements that extend from a base. In some cases, the ejection system includes a series of ejector pins which extend through the surface of the mold to eject the product in a progressive manner. In other cases, the ejection system includes moveable mold parts which pull fastener elements out of mold cavities, which may reduce or eliminate the use of pins.

In a general aspect, an injection mold for producing a product having an array of fastener elements integrally molded with and extending from a first side of a base and a method for ejecting the product from the mold are featured. The mold has a first mold surface penetrated by an array of fastener cavities. The mold includes a series of ejector pins distributed along the extent of the array of fastener cavities and adapted to extend through the first mold surface to eject the product. An ejector pin actuator is constructed and arranged to move the pins in a predetermined progressive sequence to push the molded product away from the first mold surface in the manner to pull the fastener elements from the cavities progressively across the array of cavities.

Embodiments of this principle may include one or more of the following features. At least many of the fastener cavities include undercut portions. The fastener cavities are hook-shaped. The undercut portions of the fastener cavities extend in a common direction. The pre-determined progressive sequence proceeds in the direction in which the undercut portions extend. The injection mold has an array including first and second types of fastener cavities, the fastener cavities of the first type all extending in a first direction and the fastener cavities of the second type all extending in a second direction. The injection mold defines a mold cavity for the base of deformable shape whereby the predetermined progressive sequence of the pins progressively deforms the base of product during the progressive action of the sets of ejector pins. The mold cavity for the base defines a sheet-form base that can progressively bend during the progressive action of the sets of ejector pins. The ejector pins are arranged across the array in a series of rows, with ejector pins of individual rows constructed and arranged to extend through the mold surface simultaneously, and ejector pins of consecutive rows extending through the surface in a progressive sequence.

In some embodiments, the first mold surface is curved. The ejector pins have a curved push surface arranged to follow the shape of the first mold surface. At least one of the ejector pins is adapted to extend at an oblique angle through the first mold surface.

In some configurations, the ejector pin actuator is a stepped ejector plate. The ejector pin actuator is a rotational cam assembly. The ejector pin actuator is a series of individual actuators.

In some cases, the injection mold further includes a second mold surface opposing the first mold surface with the first and second mold surfaces defining therebetween a base cavity for molding the base. The second mold surface has a second array of fastener cavities extending therefrom for forming a second array of fastener elements integrally molded with and extending from a second side of the base. The second mold surface is constructed to retract from the first mold surface to pull the array of fastener cavities extending from the second mold surface away from the fastener elements extending from the second side of the base, while the product is retained in the first mold surface. An ejector is arranged to push against perimeter portions about the second array of fastener elements to hold the molded product while the second mold surface retracts.

Among other advantages, the molded product, particularly products having uni-directional fastener elements, can be ejected from the injection mold without significantly deforming fastener elements as they are removed from the mold cavities. As a result, the fastener elements on molded product are not significantly distorted from their molded shape. In general, distortion of fastener elements during de-molding can sacrifice the ability of the fastener elements to engage loops in use, thus limiting the effectiveness of the molded product. By rolling the fastener elements out of their mold cavities, a relatively small amount of force may be used to eject the product. Molded products having thin bases and or products made of relatively soft plastics can be ejected without damaging the base due to forces applied by ejector pins. The invention may also the ejection of products at higher temperatures and thus reduce cycle time.

In another general aspect, an injection mold for producing a molded product having an array of loop-engageable fastener elements integrally molded with and extending from a first broad side of a base and at least one retaining element integrally molded with and extending from the base opposite the first broad side and a method for ejecting the product from the mold are provided. The mold includes a first mold section defining a first mold surface with multiple fastener element-shaped cavities extending therefrom for forming the array of fastener elements. The mold includes at least a second mold section adapted to be aligned with the first mold section and defining a second mold surface having at least one retaining element-shaped cavity extending therefrom for forming the retaining element. The first mold section is constructed to retract relatively from the second mold section to pull the fastener element-shaped cavities away from the fastener elements while the molded product is retained in the second mold section by the retaining element.

Embodiments of this principle may include one or more of the following features. The second mold surface includes an array of retaining element-shaped cavities shaped to form loop-engageable fastener elements. The at least second mold section defines a mounting stud integral with the base. The injection mold includes an ejector arranged to push against a perimeter portion about the array of fasteners on a first broad side of the base as the first mold section retracts. The second mold section is constructed to open the retaining element-shaped cavity to release the product.

Among other advantages, the injection mold featured in this aspect can enable the molding of products with a high fastener element density (number of fastener elements per area of base). Fastener element density is sacrificed on products that include areas of the base from which no fastener elements extend that are contacted by ejector pins. Because the injection mold does not use ejector pins to eject the molded product, fastener element density is not limited by the presence of such areas. Additionally, damage to the base of the product by ejector pins is eliminated.

In another general aspect, an injection mold for forming a product having an array of loop-engageable fastener elements integrally molded with and extending from one side of a base and a method for ejecting the product from the mold are provided. The base includes a perimeter area about the array having no fastener elements extending therefrom. The injection mold includes a first mold surface having an array of fastener cavities for forming the fastener elements. The injection mold includes a second mold surface opposing the first mold surface. The first and second mold surfaces defining therebetween a base cavity for molding the base of the product. The injection mold includes an ejector positioned between the first mold surface and the product. The ejector is constructed and arranged to push against the perimeter area about the array to push the molded product away from the first mold surface and pull the fastener elements within the array out of the respective fastener cavities.

Embodiments of this principle may include one or more of the following features. The second mold surface has an array of cavities for forming fastener elements that extend from a second side of the base. The second mold surface is constructed to retract from the first mold surface, with the molded product being retained by the first mold surface. The molded product is pushed away from the first mold surface by the ejector.

Among other advantages, the injection mold enables the forming of products having a high density of fastener elements by enabling the formation of fastener elements in areas of the base which would otherwise be free from fastener elements for accommodating for ejector pins. The injection mold in this aspect does not use ejector pins to eject the molded product and thus allows for high fastener elements densities. Ejector pin damage to the base of the product is also eliminated.

In another general aspect, an injection mold for forming a product having an array of fastener elements integrally molded with and extending from a side of the product and a method for ejecting the product from the mold are featured. The injection mold includes two mold sections moveable to open and close by movement in a given direction, and defining a cavity for the body of the molded part. The injection mold also includes a discrete fastener-element mold block disposed to define an array of hook and loop fastener elements integral with a main body of the molded part. The fastener element mold block is moveable in a direction at an angle to the given direction, to withdraw fastener mold cavities from fastener elements formed integrally with the main body of the molded part.

Embodiments of this principle may include one or more of the following features. The fastener element mold block is moveable at right angles to the direction of separation of the two mold sections. A drive member is constructed and arranged to move in a direction parallel to the given direction and shaped and arranged to advance and retract the fastener element mold block from the cavity. The driver member includes at least one linear camming surface arranged to cooperate with a mating surface of the fastener element mold block to move the fastener element mold block toward and away from the cavity. The linear camming surface and the cooperating mating surface of the fastener element mold block are a mating pair including an angled rigid pin and a corresponding bore. The driver includes a clamping plate arranged to at least assist in clamping the first and second mold sections together. Motion to clamp the mold sections together is effective to cam the fastener element mold block into molding position, and opposite motion to unclamp the section is effective to move the fastener element mold block to de-mold the fastener elements from the fastener element mold block. Compression springs disposed between the driver and the main sections are clamped. The compression springs are effective to maintain the mold sections pressed together during initial motion of the fastener element mold block that de-molds the fastener elements. The linear camming surface and the cooperating mating surface of the fastener element mold block are a mating pair including an angled rigid pin and a corresponding bore.

Among other advantages, the injection mold of this aspect enables the molding and ejecting of a molded product that can include large molded features that extend from an opposite side of the product as the fastener elements. The large mold feature, for example, can function as a stud for attaching the fastener product to another surface.

Other features and advantages will be apparent from the following description and the claims.

DESCRIPTION OF EMBODIMENTS

Referring to FIGS. 1A–1E, an injection mold 2 is constructed to form a molded product 4 having an array of hook-shape fastener elements 6 extending from a base 8 and to progressively eject molded product 4 from the injection mold. Injection mold 2 includes two separable mold halves 10, 12, the matching cavities of which define the geometry of molded product 4. Base 8 is formed in a recess 14 in mold half 10 and fastener elements 6 are formed in an array of fastener cavities 16 penetrating the surface of mold half 12. Fastener cavities 16 have an undercut portion 18 to form the hook shape of fastener elements, and are of fixed geometry during the molding and mold release action.

An upper mold plate 20 and a lower mold plate 22 are assembled face-to-face within mold half 12. Fastener cavities 16 are formed in upper mold plate 20, and can extend into the lower mold plate, if required. Upper mold plate 20 can be, for example, an insert piece which is bolted to the lower mold plate 22 and can easily be interchanged to mold products having different fastener element configurations.

Referring to FIGS. 1A–1E and 2, ejector pins 24 are arranged in a series of rows 26, 28, 30, 32 across the array of fastener cavities 16 within mold half 20. Ejector pins 24 pass through bores in the assembly of upper mold plate 20 and lower mold plate 22 and are aligned to form a mold surface 34 when the molded part is formed. To eject molded product 4, rows 26, 28, 30, 32 of ejector pins 24 (See FIG. 1E) are pushed consecutively through mold surface 34 in a progressive sequence across the series, with the ejector pins of an individual row simultaneously extending through the mold surface.

To effect this action, a stepped ejector plate 36 moves toward mold surface 34 and contacts an ejector base housing 38. For each row, a base housing 38 encases base portions 40 of ejector pins 24 in the respective rows 26, 28, 30, 32. A knock-out rod 42 which, for example is hydraulically or pneumatically driven, provides the force to move stepped ejector plate 36. The differing heights, $h_{26}$, $h_{28}$, $h_{30}$, and $h_{32}$ of the actuator surface of stepped ejector plate 30 cause ejector pins 24 to project through mold surface 34 in the desired progressive sequence. Stepped ejector plate 36 first pushes ejector pins 24 in row 26, the pins engage base 8 and deflect the corresponding portion of the base away from mold half 12. In the vicinity of row 26, fastener elements 6 are thus pulled from their fastener cavities 16. Base 8 bends as other fastener elements, spaced away from row 26, are retained in fastener cavities 16. Stepped ejector plate 36 continues to move and pushes rows 28, 30, 32 through mold surface 34 in sequence. Fastener elements 6 in the array of fastener cavities 16 are thus progressively pulled from their cavities until molded product 4 is fully ejected from mold half 12. When the molded product is ejected, it is removed in the usual ways, for example, by falling by gravity into a receptacle.

Figure 1A:
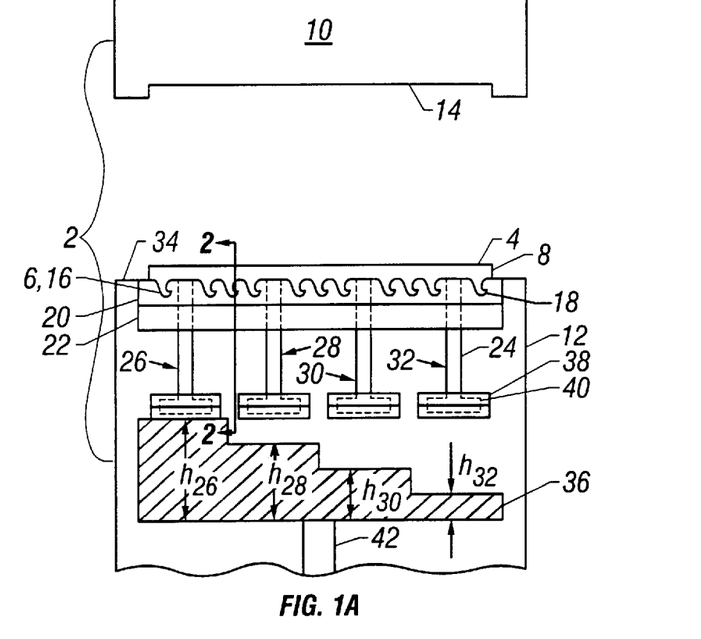
FIGS. 1A–1D schematically and sequentially illustrate the ejection of a fastener product from an injection mold.
Figure 1B:
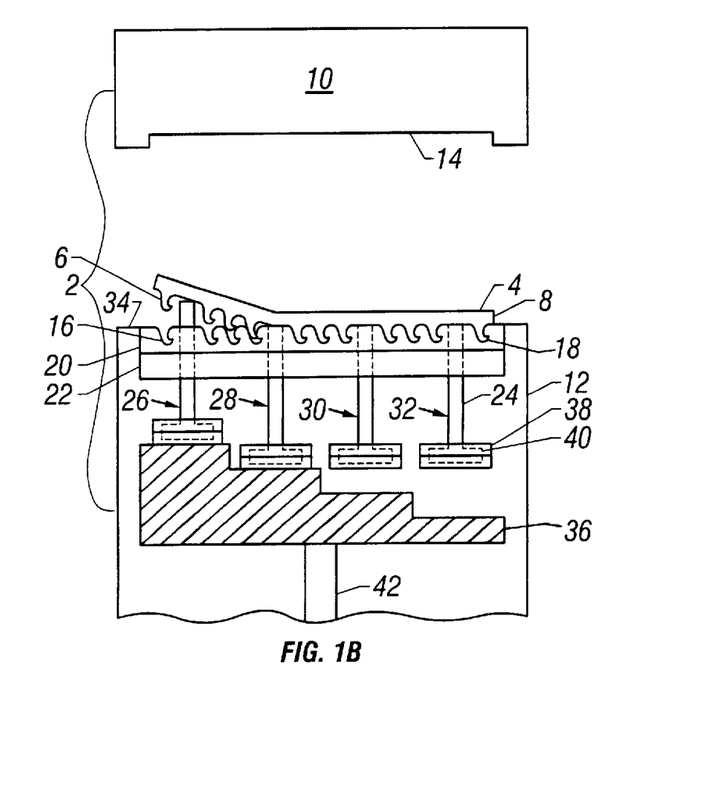
Figure 2:
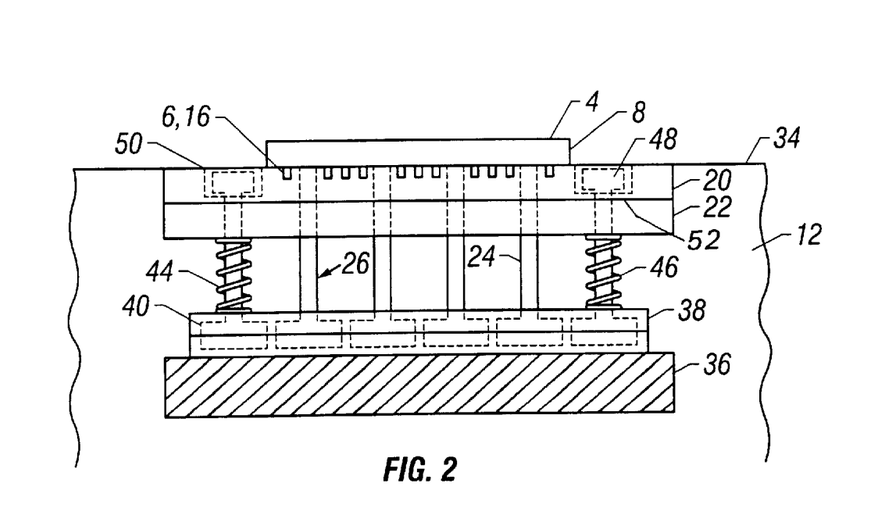
FIG. 2 is a cross-section of the injection mold taken along line 2—2 in FIG. 1A.

Referring to FIG. 2, spring-loaded return pins 44 are disposed at each end of rows 26, 28, 30, 32. The return pins for row 26 being shown in FIG. 2. Helical springs 46 around return pins 44 are positioned between lower plate 22 and ejector base housing 38. As stepped ejector plate 36 moves toward mold surface 34, helical springs 46 are compressed. After molded product 4 is ejected from mold half 12, knock-out rod 42 ceases to apply a force to stepped ejector plate 36, allowing helical springs 46 to extend and urge the ejector plate and ejector pins 24 to the rest position for the beginning of the injection cycle (FIG. 1A).

Each return pin 44 includes a shoulder 48 disposed within a recess 50 in upper mold plate 20. Shoulder 48 extends above an underlying portion 52 of upper mold plate 20. In response to a downward force, for example due to the injection of molten plastic into the injection mold, shoulder 48 contacts underlying portion 52 which prevents return pins 44 from being forced away from mold surface 34. Ejector base housings 38 couple the motion of ejector pins 24 to return pins 44 in respective rows and thus the ejector pins are also not pushed from mold surface 34.

In the embodiment shown, recess 14 for forming base 8 of the fastener product is of generally sheet form so that the base can flex progressively in response to the progressive action of the set of ejector pins 24. In other cases, the base may comprises the body of a deformable product of considerably greater thickness.

Figure 3:
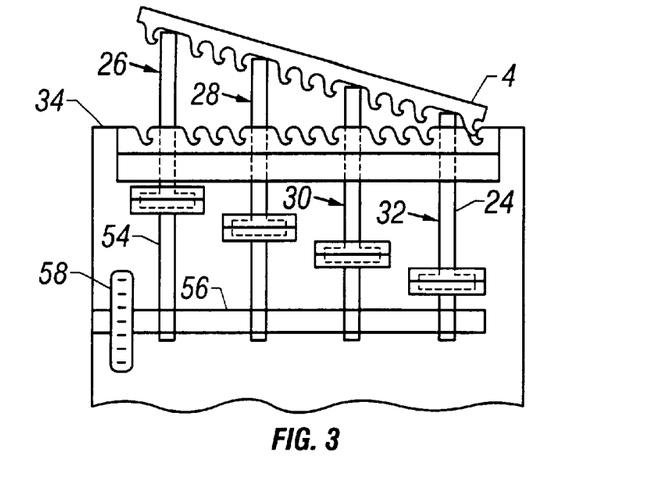
FIG. 3 shows the injection mold of FIGS. 1A–1D with a second type of ejection system.
Figure 4:
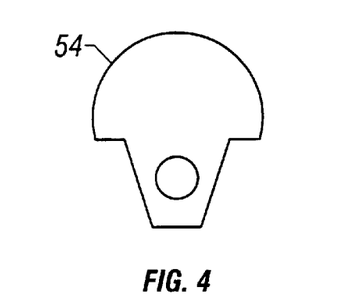
FIG. 4 illustrates a cam of the ejection system of FIG. 3.

Referring to the embodiment of FIGS. 3 and 4, in this case a rotational cam system is used to progressively push rows 26, 28, 30, 32 of ejector pins 24 through mold surface 34. The rotational cam system includes a series of cams 54 fixed along the length of a cam shaft 56. A gear 58, or alternatively a spline pulley, attached to an end of cam shaft 56 is driven by a motor (not shown) to rotate the shaft and cams 54. The rotating cams 58 are shaped to contact and push ejector base housings 38 in the direction toward mold surface 34. By providing cams 54 of decreasing height across the molded product, as shown in this case, respective rows 26, 28, 30, 32 are pushed in a progressive sequence through mold surface 34. In another arrangement, cams 54 are so shaped and mounted on the cam shaft that they contact ejector base housings 38 of respective rows 26, 28, 30, 32 at different times to provide the progressive ejection of molded product 4.

Figure 5:
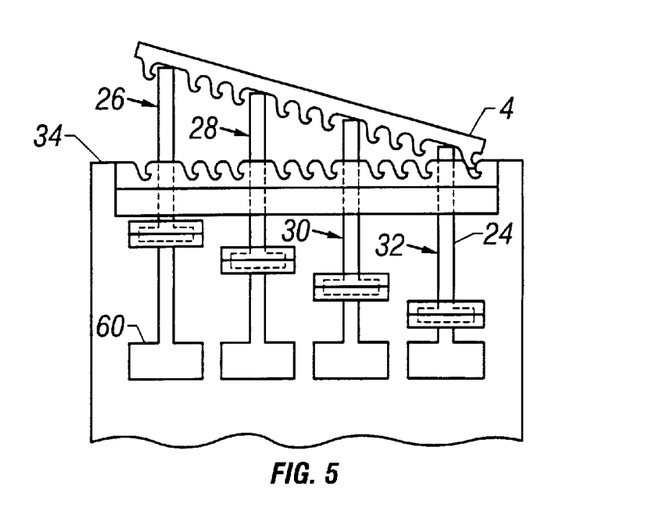
FIG. 5 shows the injection mold of FIGS. 1A–1D with a third type of ejection system.

In the embodiment of FIG. 5, a series of small individual actuators 60 are pneumatically or hydraulically driven to independently move rows 26, 28, 30, 32. The individual actuators 60 are set to push rows 26, 28, 30, 32 of ejector pins 24 through mold surface 34 in a progressive sequence to eject molded product 4.

The ejector system may include other configurations of ejector pins 24 and ejector pin actuators which move the pins. For example, for being pushed simultaneously by a flat ejector plate, ejector pins 34 in different rows may have different lengths to extend through mold surface 34 in a progressive sequence.

Figure 1C:
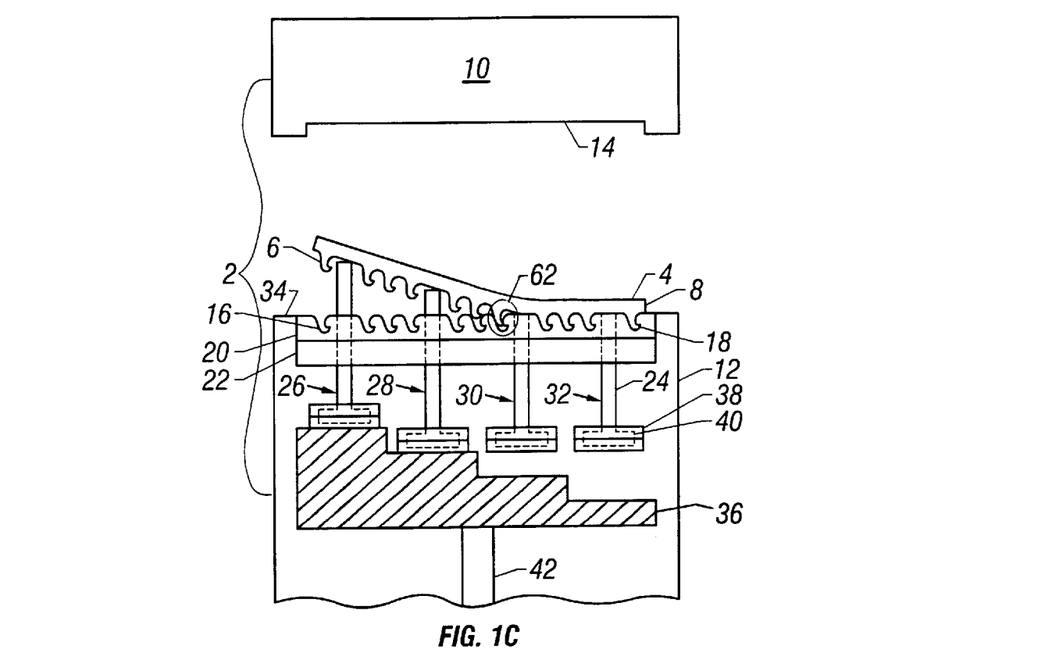
Figure 1D:
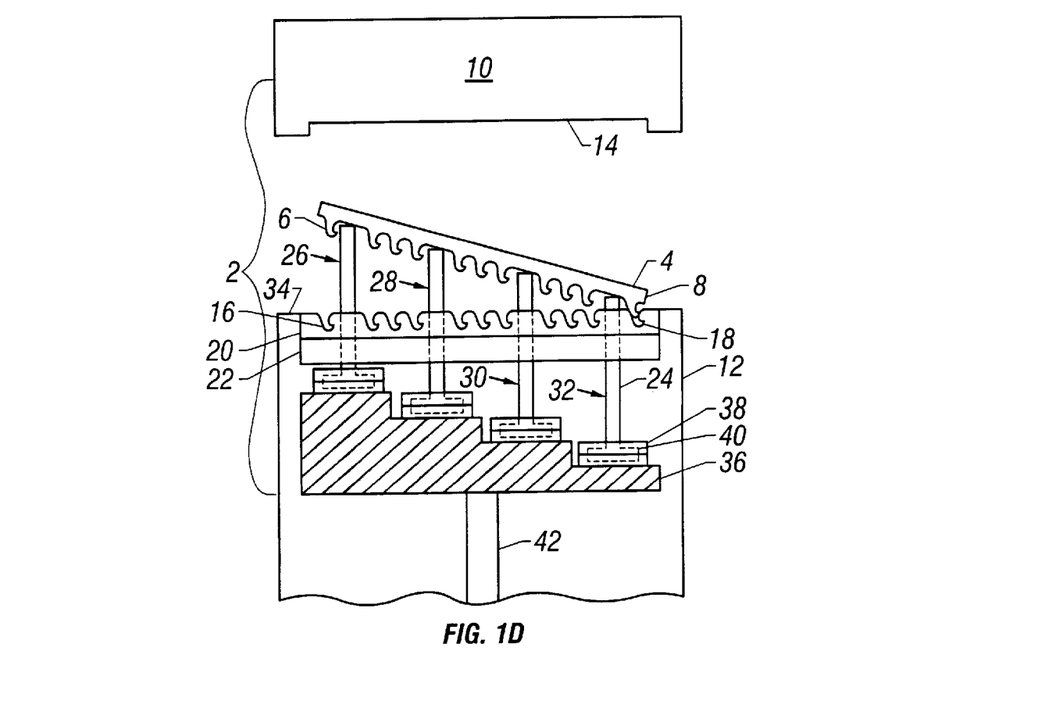
Figure 1E:
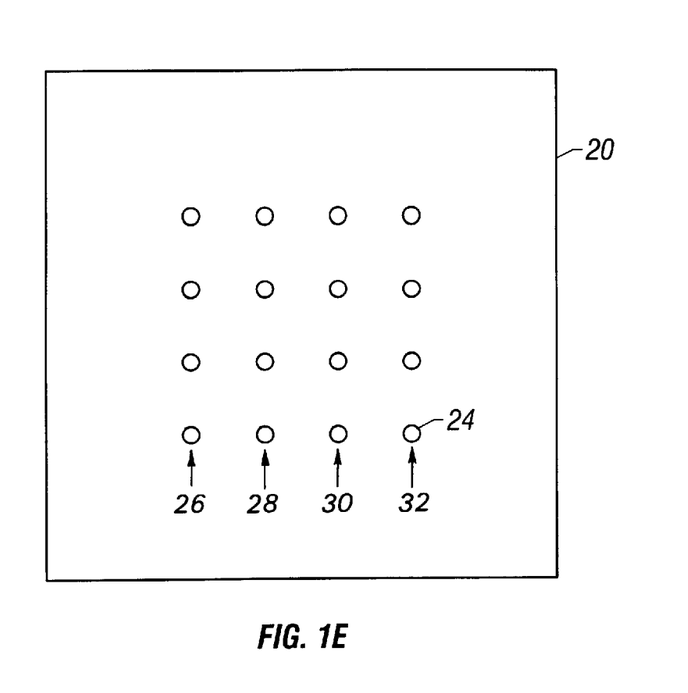
FIG. 1E is a diagrammatic plan view showing the arrangement of ejector pins.
Figure 6:
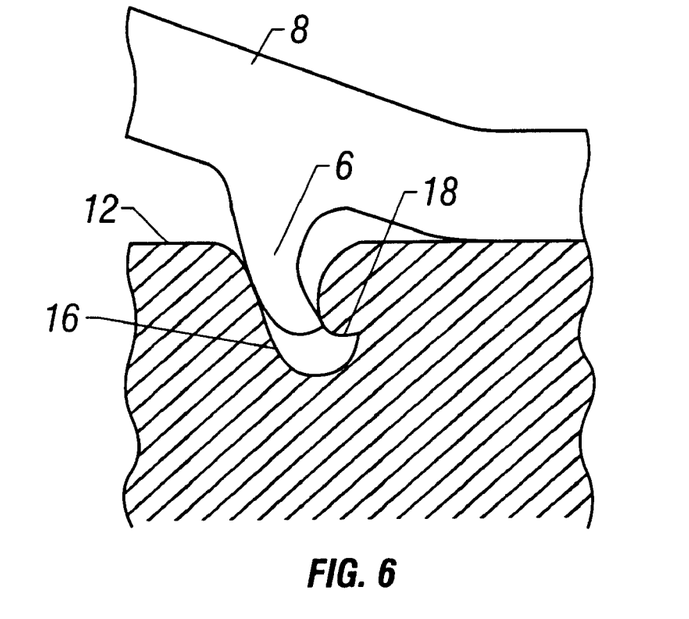
FIG. 6 is an enlarged view of area 62 in FIG. 1C.

Referring to FIG. 6, an enlarged view of section 62 of FIG. 1C shows a fastener element 6 in the act of being pulled from its fastener cavity 16, as described above. With the hook oriented in the direction shown, relative to the direction of deflection of base 8, bending of the base causes fastener element 6 to roll out of undercut portion 18 of fastener cavity 16, while following the contour of fastener cavity 16. In this case, mold half 12 provides little resistance to the releasing motion of fastener element 6, thus small amount of force is required and little or no distortion of fastener elements 6 occurs during the ejection process. This makes feasible, for example, the use of stiff resin for the fastener element portion of product formed by introducing multiple shots of stiff and then more pliable resin.

Figure 7:
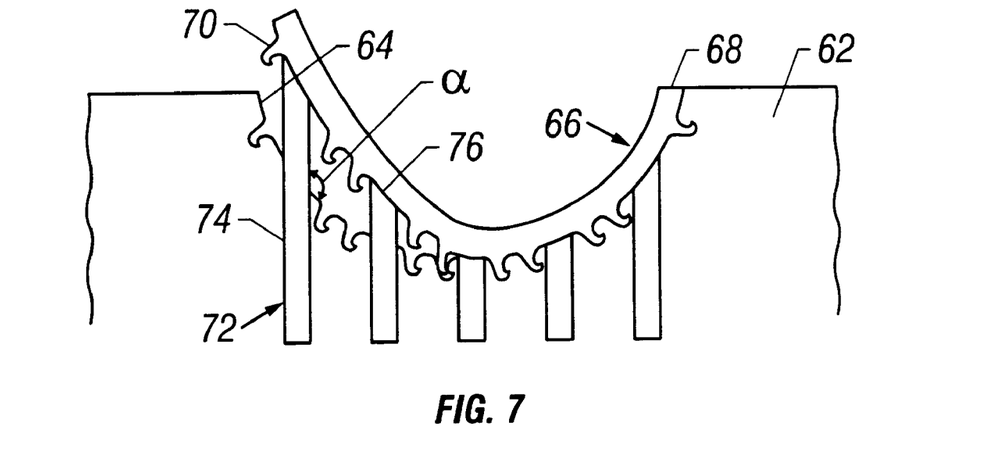
FIG. 7 illustrates a mold for producing a curved product.

Referring to the embodiment of FIG. 7, a mold half 62 includes a curved mold surface 64 for forming a molded product 66 having a curved base 68 from which fastener elements 70 project. As described above, rows 72 of ejector pins 74 progressively push through curved mold surface 64 to eject molded product 66. Ejector pins 74 have a curved push surface 76 that follows the contour of curved mold surface 64 for defining the shape of curved base 68 and providing integral contact with the base during ejection. Ejector pins 74 extend through curved mold surface 64 at an angle α when ejecting molded product 66.

Figure 8:
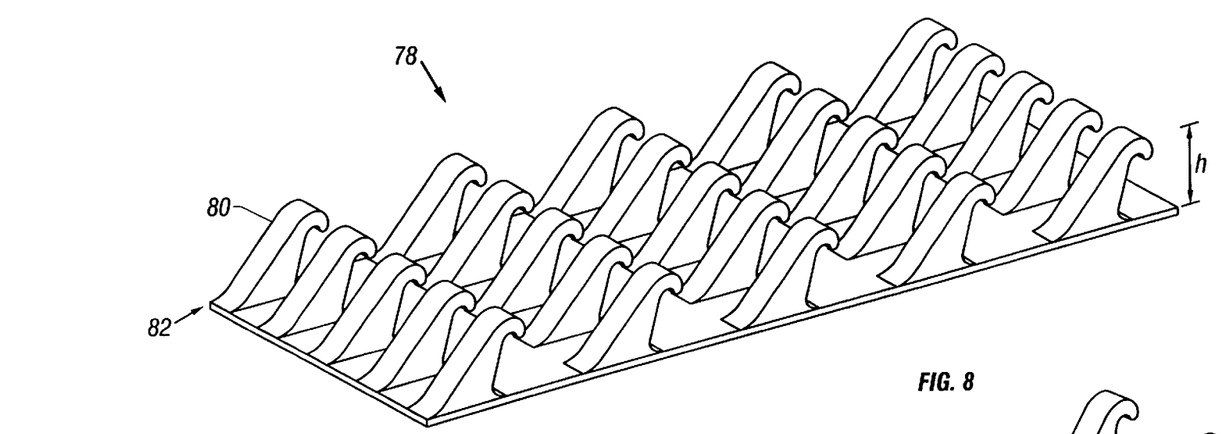
FIG. 8 shows a first arrangement of fastener elements.

Referring to FIG. 8, a portion 78 of a molded product has an array of uni-directional fastener elements 80 arranged in parallel rows 82. Fastener elements 80 generally, but not exclusively, have a height (h) of less than 0.015 inches. The array, typically, has a density of greater than 100 fastener elements per square inch, and as many as 500 fastener elements per square inch or even 1000 fastener elements per square inch depending upon the application. Products having uni-directional fastener elements 80 are particularly well-suited to the progressive ejection process. Because all fastener elements 80 are oriented in the same direction, as shown, the entire array is rolled out of fastener cavities with the above-described advantages.

Figure 9:
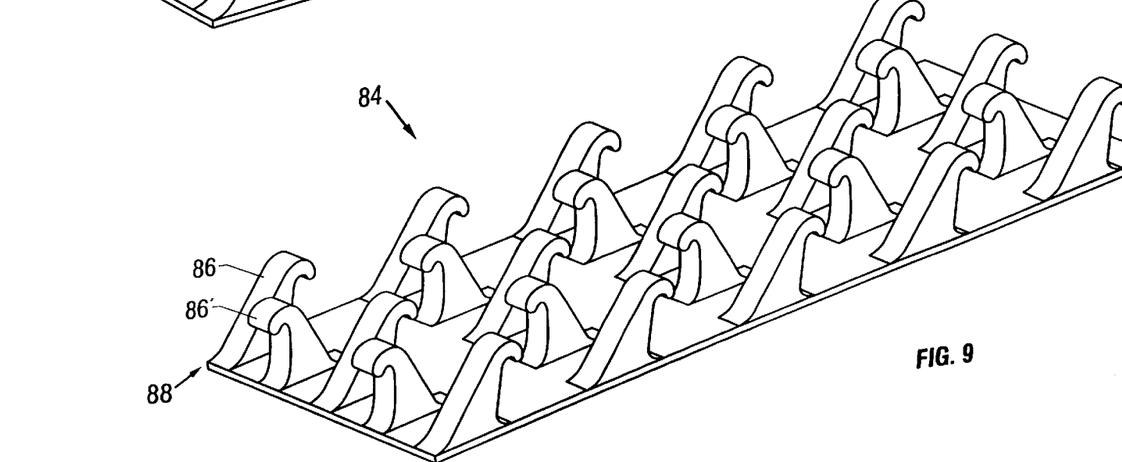
FIG. 9 shows a second arrangement of fastener elements.

Referring to FIG. 9, a portion 84 of a molded product has an array of bi-directional fastener elements 86, 86' arranged respectively in parallel adjacent rows 88. Products having bi-directional fastener elements are also suitable for progressive ejection. Typically, fastener elements oriented in one-direction are substantially rolled out of fastener cavities with the above-described advantages while fastener elements oriented in the opposite direction behave similar to molded products that are ejected in a direction perpendicular to the mold surface. Such fastener elements are resiliently distorted during ejection, and at least partially returned toward their molded shape upon releasing. The degree of restoration depends upon the particular conditions of the process, for example, selection of fastener element material, temperature of the fastener elements at ejection, and shape of the fastener elements.

Figure 10A:
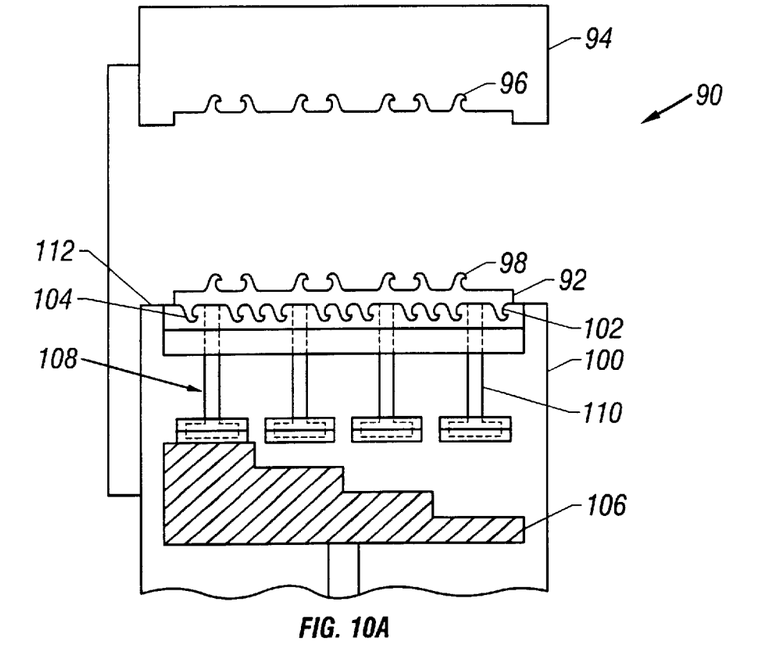
FIGS. 10A and 10B schematically and sequentially illustrate the ejection of a molded product with fastener elements extending from both sides.
Figure 10B:
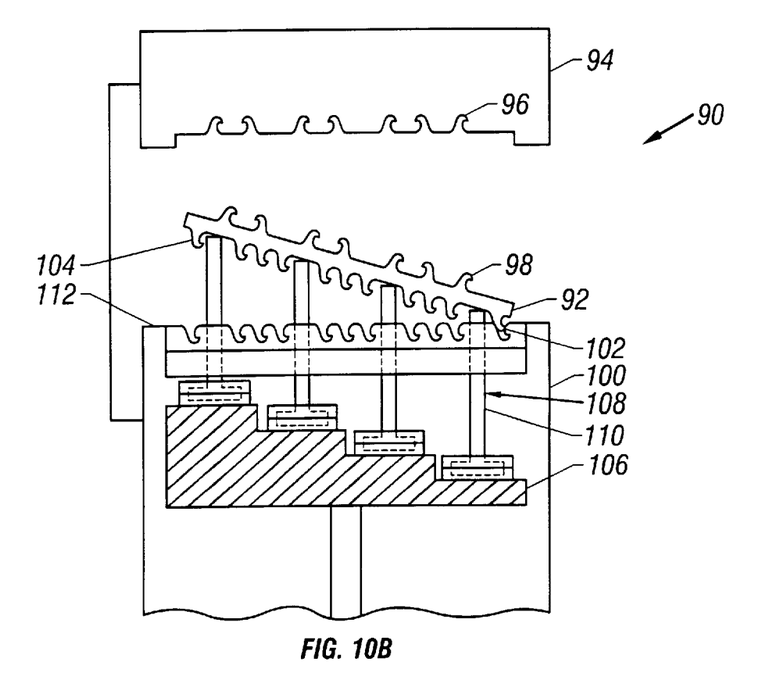

Referring to FIGS. 10A and 10B, an injection mold 90 for forming a two-sided molded product 92 includes a first mold half 94 having fastener cavities 96 for forming an array of fastener elements 98 and a second mold half 100 having a greater density of fastener cavities 102 for forming an array of fastener elements 104. When first mold half 94 retracts from second mold half 100, fastener elements 98 are pulled from fastener cavities 96 while the molded product 92 is retained in second mold half 100 (FIG. 10A). In this case, less force is required to pull the less dense array of fastener elements 98 from their cavities 96 and the fastener elements 104 on the opposite side function as retaining elements during this phase of ejection. A progressive ejection process as described above, for instance, is then used to eject molded product 92 from second mold half 100. (FIG. 10B) Stepped ejector plate 106 pushes rows 108 of pins 110 in a progressive sequence through a mold surface 112. The preferential release characteristics for one side of the part relative to the other can be achieved in various ways compatible with the intended use of the product. For instance, the first-to-be released array of fastener may have a more easily released geometry, be of a softer resin, or be maintained at a different temperature for release.

Figure 11:
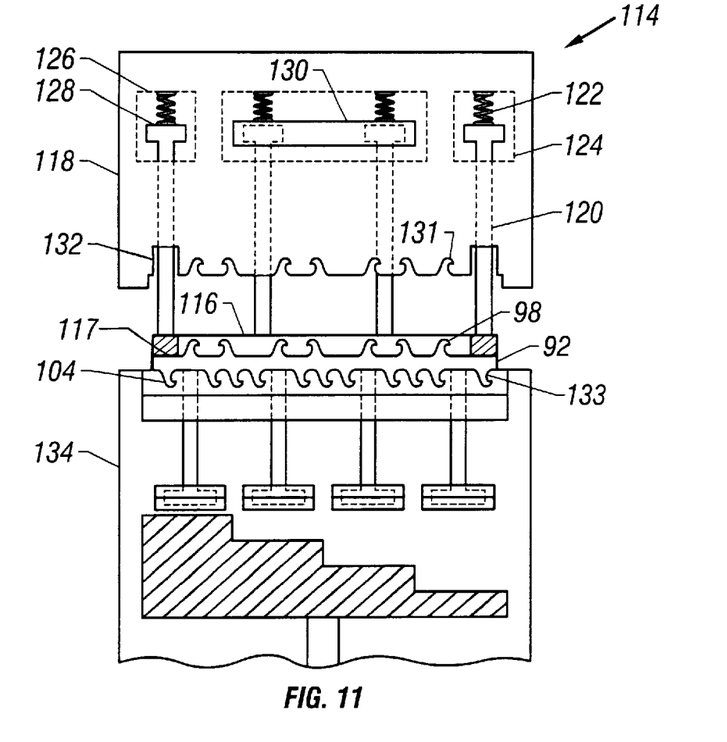
FIG. 11 schematically illustrates a second configuration for ejecting a molded product from the injection mold of FIGS. 10A and 10B.

Referring to FIG. 11, an injection mold 114 for forming two-sided molded product 92 includes a stripper plate 116 to eject the molded product from the first mold half 118. Stripper plate 116 contacts regions 117 of the surface 117 of molded product 92 free of fastener elements. In the preferred case shown, stripper plate 116 defines a perimeter ridge that surrounds or at least partially surrounds the array of fastener elements. A series of spring-loaded pins 120 is fixed to stripper plate 116, the pins extending into first mold half 118. Springs 122 are disposed in recesses 124 between a back wall 126 and either a base portion 128 of spring loaded pins 120, or alternatively, a housing 130 that surrounds base portions 128 of multiple spring-loaded pins 120.

When injection mold 114 is closed, stripper plate 116 is forced into a corresponding groove 132 in the first mold half, compressing springs 122. As first mold half 118 separates from second mold half 134, springs 122 are freed to expand to push stripper plate 116 and molded product 92 from first mold half 118, pulling fastener elements 98 from fastener cavities 131. Molded product 92, is then ejected from second mold half 134 by the progressive ejection process described above, or by other ejection methods.

The extra force provided by stripper plate 116 can lead to quick removal of fastener elements 98 from fastener cavities 131 while still warm and amenable to temporary distortion, and can provide greater latitude in the density and design of fastener element 98.

Figure 12:
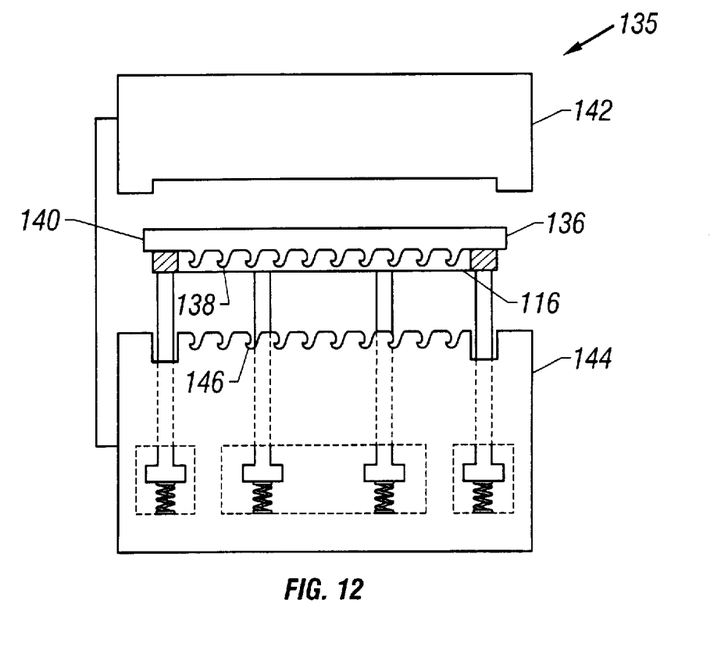
FIG. 12 schematically illustrates the ejection a molded product with fastener elements extending from one side from an injection mold.

In the embodiment of FIG. 12, injection mold 135 includes stripper plate 116 to eject a molded product 136 that has fastener elements 138 on one side of base 140. After the first mold half 142 separates from second mold half 144, stripper plate 116 forces molded product 136 from the second mold half. The size, density and character of the fastener elements and the properties of base 140 are selected to enable, stripper plate 116 to pull all fastener elements 138 from cavities 146, simultaneously.

The stripper plate that provides an extensive line of engagement about the perimeter of the array enables ejection of molded products that would be susceptible to damage by ejector pins, for example, products made of a soft polymer or products with having a thin base. Eliminating or reducing the number of ejector pins enables ejection of molded products having higher density and larger arrays of fastener elements.

Figure 13A:
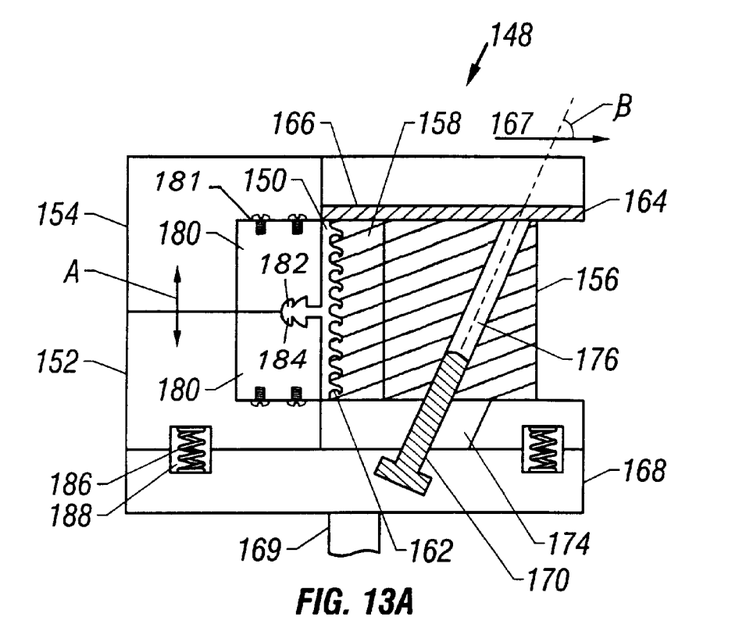
FIGS. 13A–13C schematically illustrate the ejection of a molded product with fastener elements extending from one side and a retaining element from a second side.
Figure 13B:
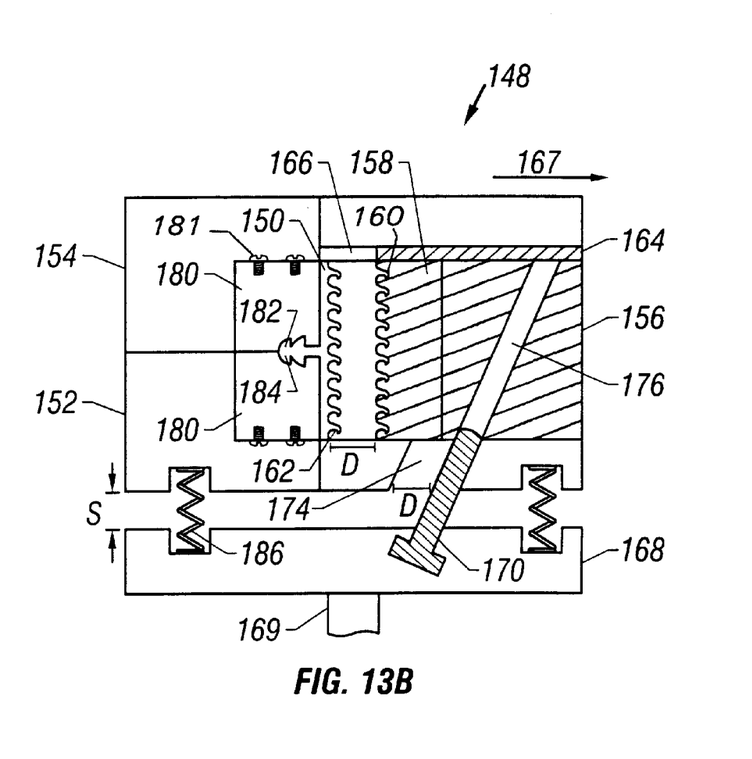
Figure 13C:
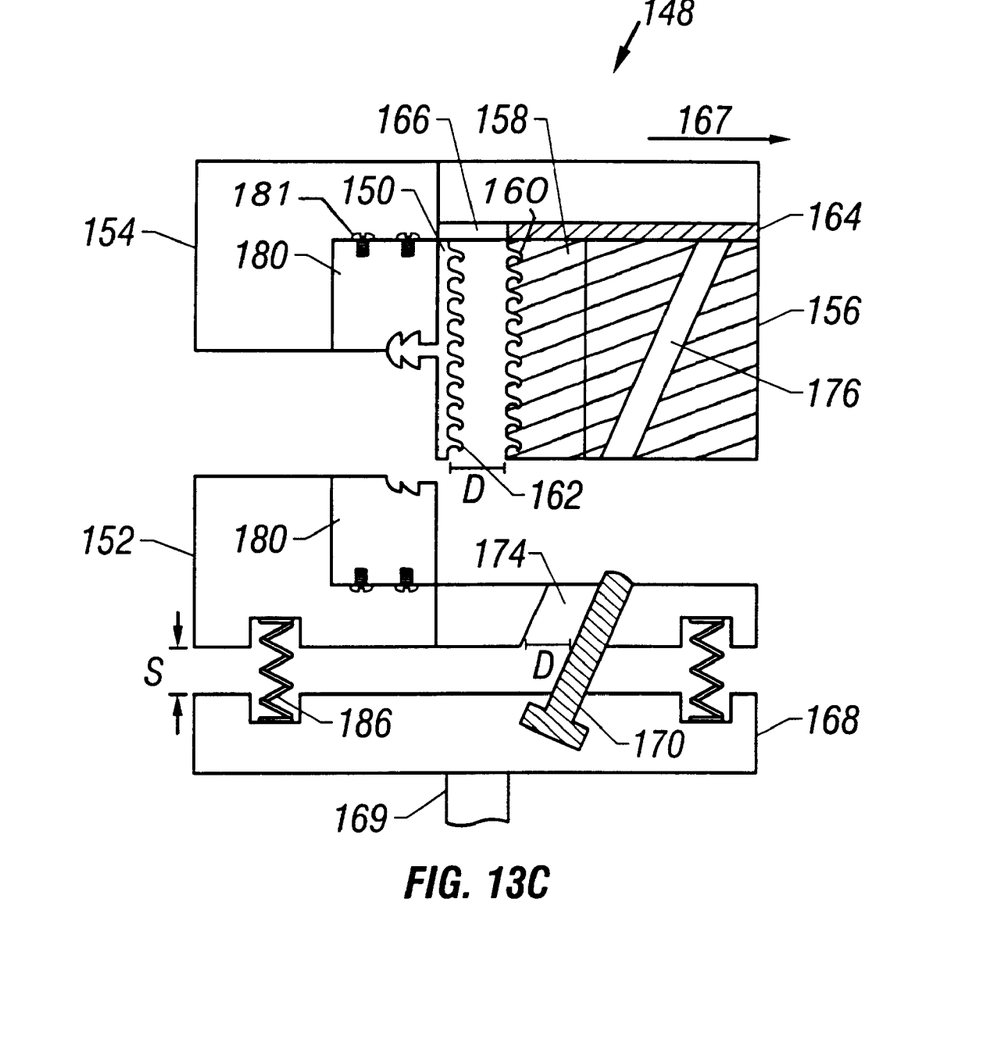

Referring to FIGS. 13A–13C, an injection mold 148 for product 150 has first and second mold halves 152, 154 that separate in the direction of arrow A, vertically in the FIG. 13A, and a side-action block 156, positioned in a space between the first and second mold halves, that includes a mold plate 158 having fastener cavities 160 for forming an array of fastener elements 162. Side action block 156 has a slide portion 164 engaged in slot 166 in second mold half 154, these being configured to allow motion of side action block 156 in the direction of arrow 167 and to prevent motion in a transverse direction.

A clamping section 168 of injection mold 148 is aligned with first mold half 152, positioned by clamping ram 169. A rigid pin 170, fixed to clamping section 168, extends at an angle β to slide direction 167 through an open space 174 in first mold half 152, and into a correspondingly angled bore 176 in side-action block 156. When clamping section 168 is moved to separate from first mold half 152, the angled, retraction action of rigid pin 170 forces side action block 156 to move, in direction 167, a distance D from product 150. Fastener cavities 160 in mold plate 158 are thus pulled away from product 150 to release fastener elements 162.

Insert mold parts 180, secured with screws 181, for example, within first and second mold halves 152, 154 define a cavity 182 for forming a retaining element or other molded feature 184 of product 150. Molded feature 184 remains in cavity 182 when side-action block 156 moves away, the molded feature thus retaining the overall product 150. Insert mold parts 180 can be easily removed and interchanged to provide flexibility to form different types of molded features.

Injection mold 148, as shown, has a spring box design, in which springs 186 ensure that molded feature 184, when side-action block 156 retracts, is retained within cavity 182. The springs 186 are disposed within spaces 188 formed between clamping section 168 and first mold half 152. When clamping section 168 separates from first mold half 152, by distance S (FIG. 13B), to actuate block 156, springs 186 hold first mold half 152 and second mold half 154 together.

In other cases, such as when the shape of the molded feature 184 provides adequate anchoring, a spring box design is not necessary.

After fastener elements 162 have been pulled from fastener cavities 160, second mold half 154, including attached side-action block 156, separates from first mold half to open cavity 182 and free the molded feature 184. Product 150 is released from injection mold 148, and may fall by gravity to a receptacle.

The side-action block ejection system of mold 148 thus does not use ejector pins which may damage molded product 150 and can limit the number of fastener elements in an array of desired dimension.

Injection mold 148 is well suited for molding and ejecting a molded product 150 that has, as its molded feature 184, a large retaining element 184 or a stud for attaching the molded product 150 to another surface.

Additional embodiments employing feature described are within the scope of the following claims.

What is claimed is:

1. An injection mold for producing a product having an array of fastener elements integrally molded with and extending from a first side of a base, the mold having a first mold surface penetrated by an array of fastener cavities, the mold comprising:
   a series of ejector pins distributed along the extent of the array of fastener cavities, the pins adapted to extend through the first mold surface to eject the product; and
   an ejector pin actuator constructed and arranged to move the pins in a predetermined progressive sequence to push the molded product away from the first mold surface in the manner to pull the fastener elements from the fastener cavities progressively across the array of fastener cavities.

2. The injection mold of claim 1 wherein at least many of the fastener cavities include undercut portions.

3. The injection mold of claim 2 wherein the fastener cavities are hook-shaped.

4. The injection mold of claim 2 wherein the undercut portions of the fastener cavities extend in a common direction.

5. The injection mold of claim 4 wherein the predetermined progressive sequence proceeds in said common direction.

6. The injection mold of claim 2 having an array comprised of first and second types of fastener cavities, the fastener cavities of the first type all extending in a first direction, and the fastener cavities of the second type all extending in a second direction.

7. The injection mold of claim 1 defining a mold cavity for the base of deformable shape whereby the predetermined progressive sequence of the pins progressively deforms the base of the product during the progressive action of the sets of ejector pins.

8. The injection mold of claim 7 in which the mold cavity for the base defines a sheet-form base that can progressively bend during the progressive action of the sets of ejector pins.

9. The injection mold of claim 1 wherein the ejector pins are arranged across the array in a series of rows, ejector pins of individual rows constructed and arranged to extend through the mold surface simultaneously and ejector pins of consecutive rows extend through the surface in a progressive sequence.

10. The injection mold of claim 1 wherein the first mold surface is curved.

11. The injection mold of claim 10 wherein the ejector pins have a curved push surface arranged to follow the shape of the first mold surface.

12. The injection mold of claim 10 wherein at least one of the ejector pins is constructed and arranged to extend through the first mold surface, at an oblique angle with respect to the first mold surface, during election of the product.

13. The injection mold of claim 1 wherein the ejector pin actuator comprises a stepped ejector plate.

14. The injection mold of claim 1 wherein the ejector pin actuator comprises a rotational cam assembly.

15. The injection mold of claim 1 wherein the ejector pin actuator comprises a series of individual actuators.

16. The injection mold of claim 1 further comprising a second mold surface opposing the first mold surface, the first and second mold surfaces defining therebetween a base cavity for molding the base, the second mold surface having a second array of fastener cavities extending therefrom for forming a second array of fastener elements integrally molded with and extending from a second side of the base, the second mold surface constructed to retract from the first mold surface to pull the array of fastener cavities extending from the second mold surface away from the fastener elements extending from the second side of the base while the product is retained in the first mold surface.

17. The injection mold of claim 16 including an ejector arranged to push against perimeter portions about the second array of fastener elements to hold the molded product while the second mold surface retracts.

18. A method of ejecting from a mold a molded product having an array of fastener elements integrally molded with and extending from a base, the mold having a first mold surface penetrated by an array of fastener cavities, the method comprising:
   moving an ejector pin actuator located in the mold in a direction toward the mold surface; and
   pushing a series of ejector pins through the mold surface in a pre-determined progressive sequence to pull the fastener elements from the fastener cavities progressively across the array and push the product away from the mold surface.

19. An injection mold for producing a product having an array of fastener elements integrally molded with and extending from a first side of a base, the mold having a first mold surface penetrated by an array of fastener cavities, the mold comprising:
   a series of ejector pins distributed along the extent of the array of fastener cavities, the pins adapted to extend through the first mold surface to eject the product; and
   an ejector pin actuator, comprising a stepped ejector plate, constructed and arranged to move the pins in a predetermined progressive sequence to push the molded product away from the first mold surface in the manner to pull the fastener elements from the fastener cavities progressively across the array of fastener cavities.

* * * * *